United States Patent
Shih et al.

(10) Patent No.: US 9,986,160 B2
(45) Date of Patent: May 29, 2018

(54) NETWORK CAMERA SYSTEM AND ILLUMINATION DEVICE THEREOF

(71) Applicant: VIVOTEK INC., New Taipei (TW)

(72) Inventors: Li-Shan Shih, New Taipei (TW); Yi-Chuan Chen, New Taipei (TW); Wen-Yuan Li, New Taipei (TW)

(73) Assignee: VIVOTEK INC., New Taipei (TW)

( * ) Notice: Subject to any disclaimer, the term of this patent is extended or adjusted under 35 U.S.C. 154(b) by 18 days.

(21) Appl. No.: 15/237,621

(22) Filed: Aug. 15, 2016

(65) Prior Publication Data
US 2017/0094170 A1 Mar. 30, 2017

(30) Foreign Application Priority Data
Sep. 24, 2015 (TW) .............................. 104131562 A

(51) Int. Cl.
*H04N 5/232* (2006.01)
*H04N 5/225* (2006.01)

(52) U.S. Cl.
CPC ....... *H04N 5/23241* (2013.01); *H04N 5/2256* (2013.01); *H04N 5/23206* (2013.01)

(58) Field of Classification Search
CPC .......... H04N 5/23241; H04N 5/23206; H04N 5/2256
See application file for complete search history.

(56) References Cited

U.S. PATENT DOCUMENTS

| 7,631,201 | B2* | 12/2009 | Hansalia | H04L 12/10 713/300 |
| 7,908,495 | B2* | 3/2011 | Diab | H04L 12/10 370/910 |
| 9,625,966 | B2* | 4/2017 | Wan | G06F 1/266 |
| 2008/0197790 | A1 | 8/2008 | Mangiaracina | |
| 2009/0121548 | A1* | 5/2009 | Schindler | H02J 1/14 307/39 |
| 2010/0007750 | A1* | 1/2010 | Lundberg | G08B 13/19656 348/211.3 |
| 2010/0031066 | A1* | 2/2010 | Geiger | H04L 12/10 713/300 |
| 2012/0271477 | A1* | 10/2012 | Okubo | H04L 12/10 700/297 |

(Continued)

FOREIGN PATENT DOCUMENTS

| CN | 104126260 A | 10/2014 |
| TW | 201304268 A1 | 1/2013 |
| TW | M463367 | 10/2013 |

*Primary Examiner* — Shahbaz Nazrul
(74) *Attorney, Agent, or Firm* — Winston Hsu

(57) ABSTRACT

A network camera system includes a network camera and an illumination device. The illumination device is connected to the network camera. The illumination device includes an illumination unit and a processing unit. The illumination unit is used for providing illumination light to the network camera. The processing unit is connected to the illumination unit for detecting a practical operation power of the network camera, calculating a maximum illumination power according to an electrical power received by the illumination device and the practical operation power, and transmitting the practical operation power and the maximum illumination power to the network camera and the illumination unit respectively.

14 Claims, 3 Drawing Sheets

(56) References Cited

U.S. PATENT DOCUMENTS

| | | | | |
|---|---|---|---|---|
| 2014/0292194 A1* | 10/2014 | Sagal | ................. | H05B 37/0227 |
| | | | | 315/34 |
| 2016/0055354 A1* | 2/2016 | Jinaraj | .................... | G06F 21/81 |
| | | | | 726/36 |
| 2016/0072990 A1* | 3/2016 | Dinev | .................. | H04N 5/2256 |
| | | | | 348/207.11 |

* cited by examiner

NETWORK CAMERA SYSTEM AND ILLUMINATION DEVICE THEREOF

BACKGROUND OF THE INVENTION

1. Field of the Invention

The present invention relates to a network camera system and an illumination device thereof, and more specifically, to a network camera system for calculating a maximum illumination power to transmit to an illumination unit according to a practical operation power of a network camera and an electrical power received by an illumination device and an illumination device thereof.

2. Description of the Prior Art

With development of PoE (Power over Ethernet) technology, a network camera system could utilize only one network cable to obtain electrical power and establish network signal transmission between a control terminal (e.g. a video surveillance host) and a network camera simultaneously via a PoE switch coupled to an external power source. Accordingly, the aforesaid design could efficiently solve the prior art problem that the wiring design of the network camera system is complicated since the network camera needs to be connected to the external power source and the control terminal respectively. In practical application, the network camera system usually utilizes an internal or external light source for providing auxiliary light to capture clear images when the network camera is operated in a dark environment (e.g. indoor or in the night).

In the aforesaid design, the PoE switch could provide a network power to the network camera and the light source via the network cable. However, since the network power is distributed in a fixed proportion for the network camera and the light source, the electrical power transmitted to the light source still remains the same even if the practical operation power of the network camera is varied (e.g. the original network camera is replaced with another network camera with a lower operation power). In such a manner, the aforesaid design may cause a poor power utilization efficiency of the network camera system and illumination of the light source could not be optimized.

SUMMARY OF THE INVENTION

The present invention provides a network camera system including a network camera and an illumination device. The illumination device is connected to the network camera. The illumination device includes an illumination unit and a processing unit. The illumination unit is used for providing illumination light to the network camera. The processing unit is connected to the illumination unit for detecting a practical operation power of the network camera, calculating a maximum illumination power according to an electrical power received by the illumination device and the practical operation power, and transmitting the practical operation power and the maximum illumination power to the network camera and the illumination unit respectively.

The present invention further provides an illumination device. The illumination device receives an electrical power and is connected to a network camera. The illumination device includes an illumination unit and a processing unit. The illumination unit is used for providing illumination light to the network camera. The processing unit is connected to the illumination unit for detecting a practical operation power of the network camera, calculating a maximum illumination power according to an electrical power received by the illumination device and the practical operation power, and transmitting the practical operation power and the maximum illumination power to the network camera and the illumination unit respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
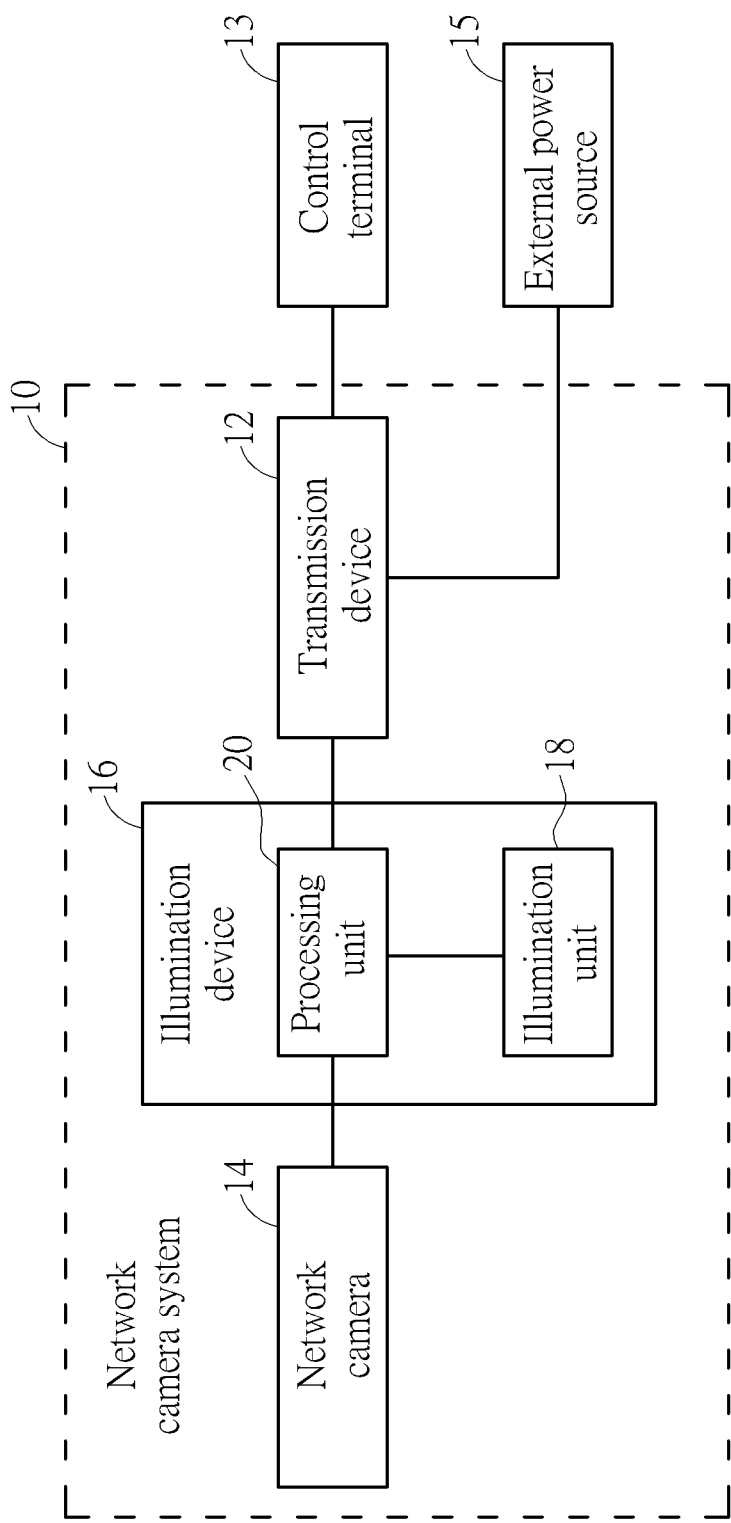
FIG. 1 is a functional block diagram of a network camera system according to an embodiment of the present invention.

Please refer FIG. 1, which is a functional block diagram of a network camera system 10 according to an embodiment of the present invention. As shown in FIG. 1, the network camera system 10 includes a transmission device 12, a network camera 14, and an illumination device 16. In this embodiment, the transmission device 12 could be preferably a PoE switch and could be connected to the illumination device 16 and a control terminal 13 (e.g. a video control host) respectively in a network cable connection manner. The transmission device 12 could be used for transforming power provided from an external power source 15 (e.g. a mains supply) into a network power and transmitting the network power to the network camera 14 via the illumination device 16. As for the related description for the Ethernet power supplying principle of the transmission device 12, it is commonly seen in the prior art and omitted herein. In practical application, signal transmission between the illumination device 16 and the transmission device 12 could be performed preferably via a network transmission port, a RS485 port, or a UART (Universal Asynchronous Receiver/Transmitter) port, but not limited thereto.

More detailed description for the illumination device 16 is provided as follows. As shown in FIG. 1, the illumination device 16 is connected to the transmission device 12 and the network camera 14. The illumination device 16 includes an illumination unit 18 and a processing unit 20. The illumination unit 18 could be preferably an infrared light emitting diode (but not limited thereto, meaning that the illumination unit 18 could be other type of light emitting diode, such as a visible light emitting diode), for providing illumination light when the network camera 14 is operated, so as to provide auxiliary light to capture clear images even if the network camera 14 is operated in a dark environment (e.g. indoor or in the night). The processing unit 20 is connected to the illumination unit 18 for detecting a practical operation power of the network camera 14, calculating a maximum illumination power according to power provided by the transmission device 12 and the practical operation power of the network camera 14, and transmitting the practical operation power and the maximum illumination power to the network camera 14 and the illumination unit 18 respectively.

To be more specific, in the condition that the network camera system 10 utilizes the network power transmitted from the transmission device 12 to provide power to the illumination device 16 and the network camera 14, the processing unit 20 could calculate the maximum illumination power according to the electrical power provided by the transmission device 12 and the practical operation power of the network camera 14 after detecting the practical operation power of the network camera 14 (e.g. the maximum operation power of the network camera 14) and the electrical power provided by the transmission device 12. In this embodiment, the maximum illumination power calculated by the processing unit 20 could be preferably equal to a difference between the electrical power provided by the transmission device 12 and the practical operation power of the network camera 14, but not limited thereto. For example, in another embodiment, the processing unit 20 could properly reduce the maximum illumination power transmitted to the illumination unit 18 for preventing the illumination unit 18 from receiving excessive instantaneous current.

In such a manner, via the aforesaid design, even if the practical operation power of the network camera 14 is varied (e.g. the original network camera 14 is replaced with another network camera having a lower operation power), the processing unit 20 could still calculate the maximum illumination power of the illumination unit 18 according to the practical operation power of the network camera 14 and the electrical power provided from the transmission device and then transmit the maximum illumination power to the illumination unit 18, so as to optimize illumination provided by the illumination unit 18. Accordingly, the present invention could efficiently solve the prior art problem that power utilization efficiency of the network camera system is poor and illumination of the light source is not optimized since the network power is distributed in a fixed proportion for the network camera and the light source.

To be noted, the illumination device 16 could further provide a network signal transmission function. That is to say, the processing unit 20 could be further used to transmit network signals transmitted from the transmission device 12 to the network camera 14, so as to establish network signal transmission between the network camera 14 and the control terminal 13 for image surveillance management.

In practical application, the processing unit 20 could be further used for controlling the illumination device 16 according to a control command transmitted from the transmission device 12 or the network camera 14 (e.g. adjusting the brightness or the light emitting angle of the illumination device 16). For example, the network camera 14 could transmit UART or RS485 signals to the processing unit 20 via its own network address to control the illumination device 16, or the network camera system 10 could assign a network address to the illumination device 16 so that the control terminal 13 could directly control the illumination device 16 via the transmission device 12. In one embodiment, the control command could be generated by the control terminal 13 and then transmitted to the processing unit 20 via the transmission device 12 for controlling the processing unit 20 to perform the corresponding operation. Furthermore, for optimizing illumination provided by the illumination unit 18 according to the practical use of the network camera system 10, the processing unit 20 could be further used for adjusting the maximum illumination power of the illumination unit 18 according to an operation temperature of the illumination unit 18 or an environment brightness of the network camera 14. For example, if the illumination unit 18 is a light emitting diode, the processing unit 20 could reduce the maximum illumination power of the illumination unit 18 when the processing unit 20 determines that the operation temperature of the illumination unit 18 is too high. Accordingly, the operation temperature of the illumination unit 18 could be reduced to prevent overheating of the illumination device 16, so that the illumination efficiency of the illumination unit 18 could be optimized and life of the illumination unit 18 or the illumination device 16 could be extended. On the other hand, if the network camera 14 determines that the environment brightness of the network camera 14 is sufficient according to the captured image analysis of the network camera 14, meaning that the illumination unit 18 does not need to be operated at the maximum illumination power, the processing unit 20 could reduce the maximum illumination power of the illumination unit 18 for power saving.

Figure 2:
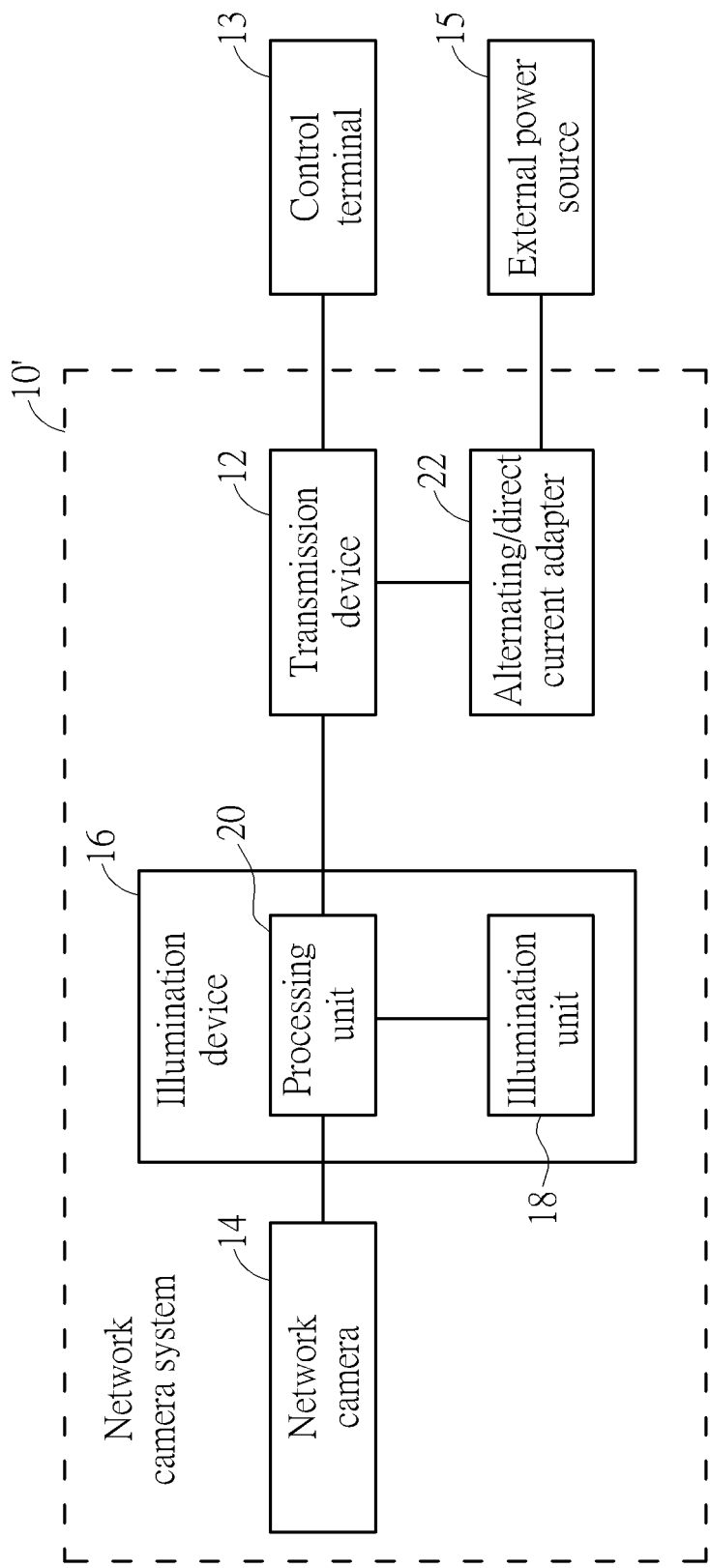
FIG. 2 is a functional block diagram of a network camera system according to another embodiment of the present invention.

It should be mentioned that the present invention could adopt the design that the transmission device obtains the electrical power via an alternating/direct current adapter. For example, please refer to FIG. 2, which is a functional block diagram of a network camera system 10' according to another embodiment of the present invention. Components both mentioned in this embodiment and the aforesaid embodiment represent components with similar structures or functions, and the related description is omitted herein. As shown in FIG. 2, the network camera system 10' includes the transmission device 12, the network camera 14, the illumination device 16, and an alternating/direct current adapter 22. The alternating/direct current adapter 22 is connected to the transmission device 12 and the external power source 15. The transmission device 12 could transform the electrical power of the external power source 15 transmitted from the alternating/direct current adapter 22 into the network power and then transmit the network power to the network camera 14 via the processing unit 20. That is to say, the transmission device 12 could utilize the alternating/direct current adapter 22 to be connected to the external power source 15 for obtaining the network power and could transmit Ethernet signals transmitted from the control terminal 13 to the processing unit 20, so that the processing unit 20 could establish network signal transmission between the control terminal 13 and the network camera 14 and network power transmission between the transmission device 12 and the network camera 14 for image surveillance management. In one embodiment, the external power source 15 could be a mains supply, a direct current source, or any other type of power source, but not limited thereto.

Figure 3:
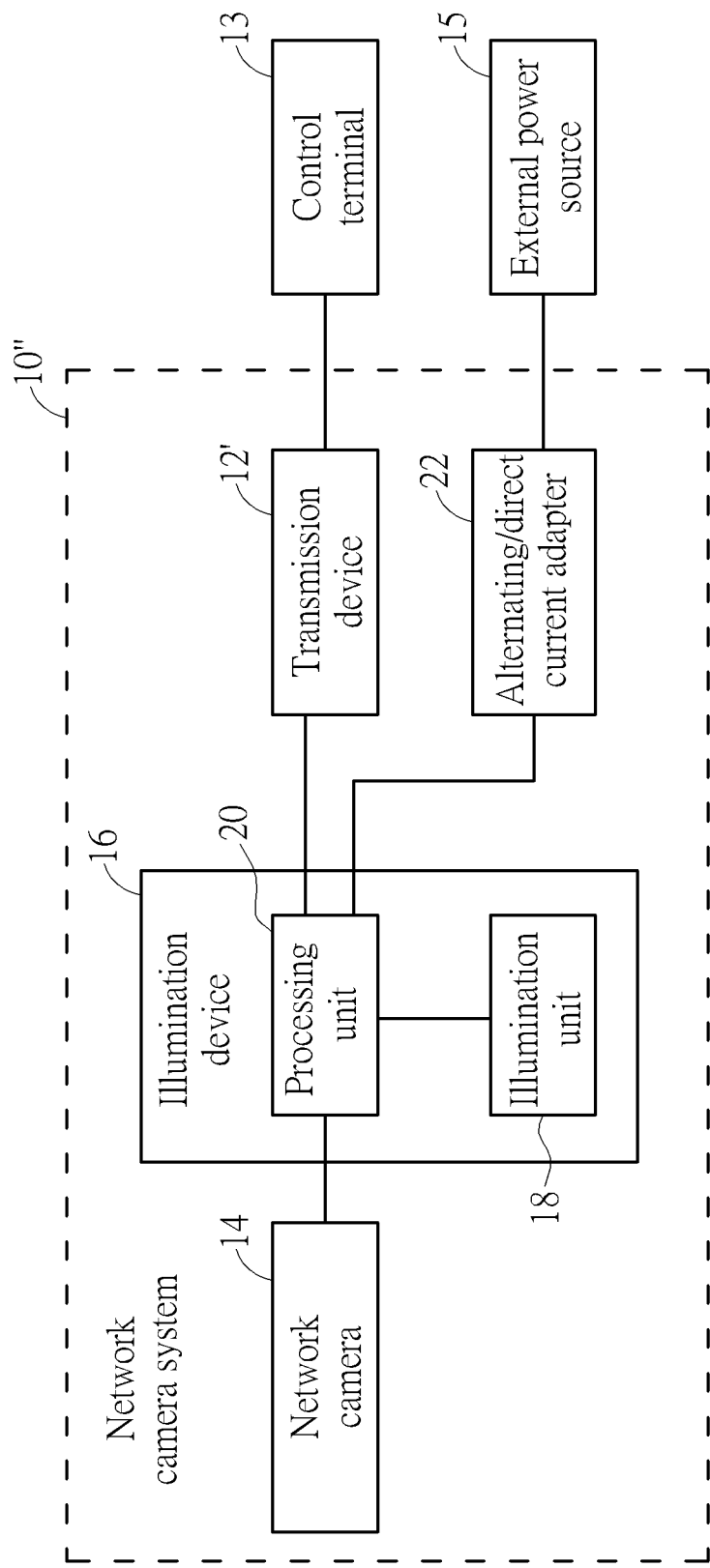
FIG. 3 is a functional block diagram of a network camera system according to another embodiment of the present invention.

Furthermore, please refer to FIG. 3, which is a functional block diagram of a network camera system 10" according to another embodiment of the present invention. Components both mentioned in this embodiment and the aforesaid embodiment represent components with similar structures or functions, and the related description is omitted herein. As shown in FIG. 3, the network camera system 10" includes the network camera 14, the illumination device 16, the alternating/direct current adapter 22, and a transmission device 12'. In this embodiment, the transmission device 12' could be a signal transmitting unit (could be a non-PoE switch or a PoE switch) connected to the processing unit 20. Network signal transmission between the transmission device 12' and the network camera 14 could be performed by the processing unit 20, and the alternating/direct current adapter 22 could be directly connected to the processing unit 20 for transmitting the electrical power from the external power source 15 to the processing unit 20. To be noted, in practical application, since the processing unit 20 could not directly detect the magnitude of the electrical power transmitted from the alternating/direct current adapter 22, the magnitude of the electrical power could be manually inputted to the processing unit 20 by a user according to power information provided from the alternating/direct current adapter 22. In brief, in this embodiment, the processing unit 20 could establish network signal transmission between the control terminal 13 and the network camera 14 via the transmission device 12' and power transmission between the external power source 15 and the network camera 14 via the alternating/direct current adapter 22 for image surveillance management.

In summary, the processing unit of the illumination device provided by the present invention could be used for detecting the source of the electrical power. If the transmission device is a PoE switch and is connected to the illumination device and the control terminal respectively and the electrical power received by the illumination device is provided from the control terminal (or from the external power source via the alternating/direct current adapter), the processing unit could directly detect the magnitude of the electrical power provided by the transmission device according to network power information transmitted from the PoE switch, and could calculate the maximum illumination power after detecting the practical operation power of the network camera. On the other hand, if the processing unit is directly connected to the alternating/direct current adapter to obtain the electrical power for the illumination device and the network camera, the processing unit could obtain the magnitude of the electrical power provided by the alternating/direct current adapter according to power information of the alternating/direct current adapter manually inputted to the processing unit by the user, and could calculate the maximum illumination power after detecting the practical operation power of the network camera. To be noted, if the network camera is directly connected to the external power source to obtain the operation power, the processing unit could calculate all of the received electrical power as the maximum illumination power and then transmit the maximum illumination power to the illumination unit for providing illumination light since the processing unit does not need to provide the electrical power to the network camera.

Compared with the prior art adopting the design that the network power is distributed in a fixed proportion, the illumination device of the present invention could calculate the maximum illumination power according to the practical operation power of the network camera and the received electrical power and then transmit the maximum illumination power to the illumination unit, so as to optimize illumination of the illumination unit. In such a manner, the present invention could greatly improve the power utilization efficiency and the image capturing quality of the network camera system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network camera system comprises:
   a network camera; and
   an illumination device connected to the network camera, the illumination device comprising:
   an illumination unit for providing illumination light to the network camera; and
   a processing unit connected to the illumination unit for detecting a practical operation power of the network camera, calculating a maximum illumination power according to an electrical power received by the illumination device and the practical operation power, and transmitting the practical operation power and the maximum illumination power to the network camera and the illumination unit respectively;
   a transmission device connected to the illumination device, the transmission device being a signal transmitting unit to be connected to the processing unit, the processing unit being used for establishing network signal transmission between the signal transmitting unit and the network camera; and
   an alternating/direct current adapter connected to the processing unit for connecting to an external power source to transmit the electrical power to the processing unit;
   wherein a magnitude of the electrical power transmitted from the alternating/direct current adapter is manually inputted to the processing unit according to power information provided from the alternating/direct current adapter.

2. The network camera system of claim 1, wherein the maximum illumination power is equal to a difference between the electrical power and the practical operation power.

3. The network camera system of claim 1, wherein the processing unit is further used for controlling the illumination device according to a control command transmitted from the transmission device or the network camera.

4. The network camera system of claim 3, wherein the illumination device has a network address, the transmission device forwards the control command generated by a control terminal to the processing unit of the illumination device, and the processing unit further controls the illumination device to perform a corresponding operation according to the control command.

5. The network camera system of claim 1, wherein the processing unit is further used for transmitting network signals transmitted from the transmission device to the network camera.

6. The network camera system of claim 1, wherein the processing unit is further used for detecting the source of the electrical power.

7. The network camera system of claim 1, wherein the processing unit is used for adjusting the maximum illumination power according to an operation temperature of the illumination unit or an environment brightness of the network camera.

8. An illumination device receiving an electrical power and being connected to a network camera, the illumination device comprising:
   an illumination unit for providing illumination light to the network camera; and
   a processing unit connected to the illumination unit for detecting a practical operation power of the network camera, calculating a maximum illumination power according to the electrical power received by the illumination device and the practical operation power, and transmitting the practical operation power and the maximum illumination power to the network camera and the illumination unit respectively, the processing unit being connected to a transmission device, the transmission device being a signal transmitting unit, the processing unit being used for establishing network signal transmission between the signal transmitting unit and the network camera, the processing unit being connected to an external power source via an alternating/direct current adapter for receiving the electrical power, and a magnitude of the electrical power transmitted from the alternating/direct current adapter being manually inputted to the processing unit according to power information provided from the alternating/direct current adapter.

9. The illumination device of claim 8, wherein the maximum illumination power is equal to a difference between the electrical power and the practical operation power.

10. The illumination device of claim 8, wherein the processing unit is further used for controlling the illumination device according to a control command transmitted from the transmission device or the network camera.

11. The illumination device of claim 10, wherein the illumination device has a network address, the transmission device forwards the control command generated by a control terminal to the processing unit of the illumination device, and the processing unit further controls the illumination device to perform a corresponding operation according to the control command.

12. The illumination device of claim 8, wherein the processing unit is further used for transmitting network signals transmitted from the transmission device to the network camera.

13. The illumination device of claim 8, wherein the processing unit is further used for detecting the source of the electrical power.

14. The illumination device of claim 8, wherein the processing unit is used for adjusting the maximum illumination power according to an operation temperature of the illumination unit or an environment brightness of the network camera.

* * * * *